(12) United States Patent
Kontsevich et al.

(10) Patent No.: US 10,303,865 B2
(45) Date of Patent: May 28, 2019

(54) BLUE/VIOLET LIGHT TOUCHLESS PALM PRINT IDENTIFICATION

(71) Applicant: Redrock Biometrics, Inc., San Bruno, CA (US)

(72) Inventors: Leonid Kontsevich, San Francisco, CA (US); Hua Yang, Cupertino, CA (US)

( * ) Notice: Subject to any disclaimer, the term of this patent is extended or adjusted under 35 U.S.C. 154(b) by 0 days.

(21) Appl. No.: 15/615,683

(22) Filed: Jun. 6, 2017

(65) Prior Publication Data

US 2018/0060554 A1 Mar. 1, 2018

Related U.S. Application Data

(60) Provisional application No. 62/382,067, filed on Aug. 31, 2016.

(51) Int. Cl.
| | | |
|---|---|---|
| *G06K 9/00* | (2006.01) | |
| *G06F 21/32* | (2013.01) | |
| *H04L 29/06* | (2006.01) | |
| *G06K 9/32* | (2006.01) | |
| *H04N 5/232* | (2006.01) | |

(Continued)

(52) U.S. Cl.
CPC ......... *G06F 21/32* (2013.01); *G06K 9/00033* (2013.01); *G06K 9/00067* (2013.01); *G06K 9/00087* (2013.01); *G06K 9/00671* (2013.01); *G06K 9/32* (2013.01); *H04L 63/0861* (2013.01); *H04N 5/23222* (2013.01); *H04N 5/23229* (2013.01); *H04N 5/23293* (2013.01); *H04N 5/44504* (2013.01); *H04W 12/06* (2013.01); *G06T 19/006* (2013.01); *H04N 13/332* (2018.05); *H04N 13/361* (2018.05); *H04N 2005/4432* (2013.01)

(58) Field of Classification Search
CPC ........... H04N 5/23222; H04N 5/23229; H04N 5/2293; H04N 5/44504; H04N 13/332; H04N 13/361; H04N 2005/4432; G06F 21/32; G06K 9/00033; G06K 9/00067; G06K 9/00087; G06K 9/00671; G06K 9/32; G06T 19/006
See application file for complete search history.

(56) References Cited

U.S. PATENT DOCUMENTS 8,538,088 B2 9/2013 Hama et al.
9,594,891 B2 3/2017 Iwata
(Continued)

OTHER PUBLICATIONS

Xu, X, et al., "Multispectral Palmprint Recognition Using a Quaternion Matrix," Sensors 2012, 12, Apr. 10, 2012, 4633-4647.*
(Continued)

*Primary Examiner* — Ping Y Hsieh
(74) *Attorney, Agent, or Firm* — Brad Bertoglio

(57) ABSTRACT

A computing platform is described to match a palm print digital representation to a palm print template. The platform includes logic causing an illumination source to illuminate a field of view of a camera with an emission spectrum predominately in a wavelength range less than 485 nm; capturing a set of images using the camera of a palm during the illumination; processing the set of images to determine a set of identifying features of the palm according to intensity gradients in the wavelength range of the illumination source; and comparing the set of identified features with enrolled palm prints to identify the palm.

23 Claims, 15 Drawing Sheets

(51) Int. Cl.
*H04N 5/445* (2011.01)
*H04W 12/06* (2009.01)
*H04N 13/332* (2018.01)
*H04N 13/361* (2018.01)
*G06T 19/00* (2011.01)
*H04N 5/44* (2011.01)

(56) References Cited

U.S. PATENT DOCUMENTS

| | | |
|---|---|---|
| 9,659,205 B2 | 5/2017 | Demos |
| 2012/0253607 A1 | 10/2012 | Choi |
| 2015/0020181 A1* | 1/2015 | Iwata ............... G06F 21/32 726/7 |

OTHER PUBLICATIONS

"Canny edge detector," https://en.wikipedia.org/wiki/Canny_edge_detector, downloaded Jun. 1, 2017, 6 pages.

"Corner Detection," https://en.wikipedia.org/wiki/Corner_detection, downloaded May 30, 2017, 8 pages.

"Features from accelerated segment test," https://en.wikipedia.org/wiki/Features_from_accelerated_segment_test, downloaded May 30, 2017, 6 pages.

"File:CIExy1931.png," found at https://commons.wikimedia.org/wiki/File:CIExy1931.png, downloaded Jun. 5, 2017, 4 pages.

"Local optimum," https://en.wikipedia.org/wiki/Local_optimum, downloaded May 30, 2017, 2 pages.

"Random Sample Consensus (RANSAC)," https://en.wikipedia.org/wiki/Random_sample_consensus, downloaded May 30, 2017, 10 pages.

"Scale-invariant feature transform," https://en.wikipedia.org/wiki/Scale-invariant_feature_transform, downloaded May 30, 2017, 18 pages.

Frangi et al. "Multiscale vessel enhancement filtering," MICCAI '98, v. 1496, Springer Verglag, Berlin, Germany, Oct. 11, 1998, pp. 130-137.

Harris et al., "A combined corner and edge detector," In Proc. of Fourth Alvey Vision Conference Aug. 31-Sep. 2, 1988, 3 pages.

Khatkar et al., "Biomedical Image Enhancement Using Wavelets," International Conference on Computer, Communication and Convergence, Dec. 17-28, 2014, Procedia Computer Science 48 (2015) 513-517.

Krujatz et al., "Exploiting the Potential of OLED-Based Photo-Organic Sensors for Biotechnological Applications," Chem Sci J 2016, 7:3, Sep. 2016, 10 pages.

Lowe, "Object recognition from local scale-invariant features," Proceedings of the Seventh IEEE International Conference on Computer Vision, v2. Kerkyra, Sep. 20-27, 1999, pp. 1150-1157.

Rosten et al., "Faster and Better: A Machine Learning Approach to Corner Detection," in IEEE Transactions on Pattern Analysis and Machine Intelligence, vol. 32, No. 1, pp. 105-119, Jan. 2010.

Xu, X, et al, "Multispectral Palmprint Recognition Using a Quatemion Matrix," Sensors 2012, 12, Apr. 10, 2012, 4633-4647.

\* cited by examiner

BLUE/VIOLET LIGHT TOUCHLESS PALM PRINT IDENTIFICATION

CROSS-REFERENCE TO RELATED APPLICATIONS

This application claims the benefit of U.S. Provisional Application No. 62/382,067, entitled "A GUIDE FOR POSITIONING PALM IN VR/AR ENVIRONMENT", filed 31 Aug. 2016. This provisional application is hereby incorporated by reference for all purposes.

BACKGROUND

Field

The technology disclosed generally relates to detecting biometric features of a control object including human hands, and more particularly relates to application of palm print digitalization to security and authentication technologies.

Description of Related Art

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Palm print authentication has been subject of development for some types of authentication systems. A variety of different approaches have been tried. For example, some approaches have used palm geometry to try to identify someone by their palm. Others use palm vein patterns. Still others use combinations of parameters. Yet these implementations failed to live up to the standards required for widespread adoption. Still others required fixtures to hold the hand rigid in space.

Also, a number of technologies have been described for palm recognition that require taking a sequence of images or frames in a video of a palm under illumination that highlights the features relied upon. The features for palm recognition include surface features that are recognizable using visible light, and sub-surface features like vein patterns visible using infrared light. However, the requirement for visible light illumination limits the range of applications for which palm print authentication can be used. Also, visible light illumination required for palm print authentication can attract attention from bystanders, because of the lighting used to capture images used for the authentication procedures.

It is desirable to provide a palm print authentication technology which can overcome some or all of the issues discussed above.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

A system and various implementations are described for performing computationally efficient identification and authentication of individuals using non-contact or contact-free biometric recognition of the user's palm using blue light, or using light having in general wavelengths below 485 nm, including blue, violet, and ultraviolet light. In embodiments usable in low light conditions, an illumination source with an emission spectrum completely or predominantly below 485 nm is utilized. For the purposes of the present application, the emission spectrum of the illumination source is predominantly below 485 nm, when perceived by a typical human observer as a subdued color such as dark blue, dark blue-violet, dark violet, or not visible.

Figure 1:
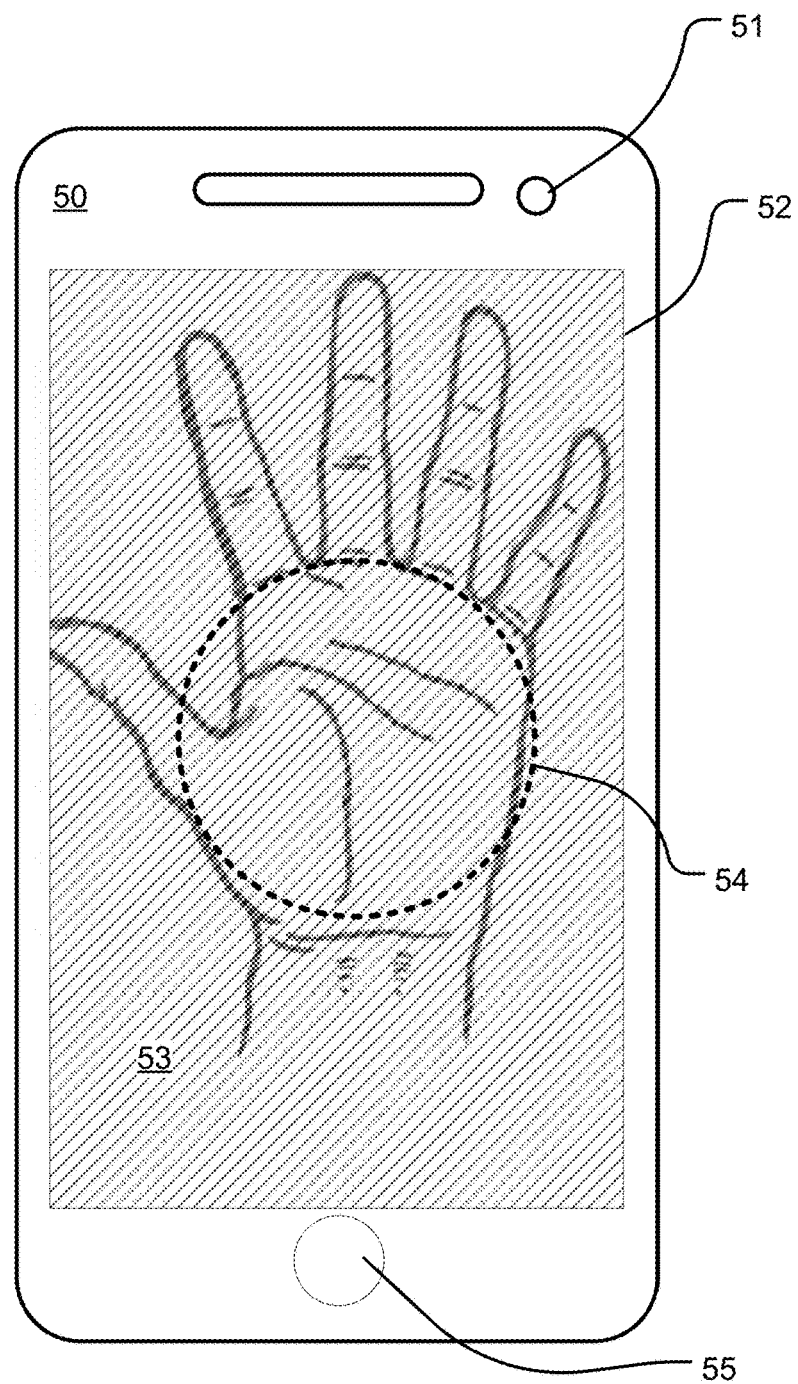
FIG. 1 illustrates a computing device having a display and graphic user interface that comprise a viewfinder image of a camera and an illumination pattern as described herein.

FIG. 1 illustrates a computing device, which in this example is a mobile telephone 50. In other examples, the computing device can be a laptop, desktop, smart TV, etc. The mobile telephone 50 includes a front facing (selfie) camera having a lens 51 and a display screen 52. In this example, a button 55 is on the face of the mobile phone 50. The field of view of the camera via lens 51 is a region above the display screen 52. A viewfinder image produced by the camera is displayed on the display screen 52 in this example. In some embodiments, the viewfinder image is limited to a region, such as the circular region 54 shown in the drawing. The mobile telephone 50 includes logic to execute a sequence of operations to perform a palm authentication process. The sequence of operations includes illuminating a field of view of the camera with an illumination source having an emission spectrum including wavelengths in a range less than 485 nm, in the blue/violet or near ultraviolet range. Also, the operations include capturing a set of images of a palm in the illuminated field of view using the camera. The sequence of operations includes processing the set of images to determine a set of identifying features of the palm, according to intensity gradients in the wavelength range of the illumination source. Also, the sequence of operations includes comparing the set of identified features with enrolled palm prints to identify the palm.

The display 52 is hatched to indicate the presence of an illumination pattern 53 on the display generated by an image frame produced by the computing device within a color range predominately below 485 nm. The illumination pattern can be solid, or hatched or patterned allowing clear view of unmasked parts of the display. In the illustrated example, the illumination pattern is partially transparent, allowing view of the image captured by the camera simultaneously with an overlying illumination pattern. In other embodiments, the illumination pattern may include an opening (e.g. clear space) in region 54 for example configured to show a region of interest in the image, and allow a clearer view for the purposes of alignment of the image on the screen by the user.

As a result use of the illumination pattern in a wavelength predominately in a range below 485 nm, the display 52 is not as likely to attract attention of bystanders during the authentication process.

Furthermore, using an illumination source having an emission spectrum including wavelengths less than 485 nm allows identifying a large number of features using intensity gradients in wavelengths less than 485 nm, suitable for use in the authentication process. Thus, illumination only in this range can be relied upon in embodiments of the present technology. Also, processing only of data indicating features within the wavelength range of below 485 nm using images taken under illumination predominately below 485 nm can be relied upon in embodiments of the present technology. In some embodiments, the emission spectrum of the illumination source can be limited to wavelengths below 485 nm.

Experimentation has been conducted to compare the feature density of palm images at different wavelengths. Below are the relative densities of corner features at different spectra.

The corner features were extracted with Matlab function "detectFASTFeatures" with the contrast threshold at 0.01. The data has been normalized to the high density features detectable under blue light at 460 nm.

| Color | Wavelength | Relative Feature Density |
|---|---|---|
| Blue | 460 nm | 1.00 |
| Orange | 630 nm | 0.25 |
| Red | 700 nm | 0.19 |

-continued

| Color | Wavelength | Relative Feature Density |
|---|---|---|
| IR1 | 850 nm | 0.10 |
| IR2 | 940 nm | 0.04 |
| White | | 0.81 |

As can be seen, blue light, and a range of wavelengths below 485 nm is very effective for the purposes of extracting skin surface features from an image of a palm. For example, examples include illumination sources effective for extracting skin surface features having wavelengths in the range of 485 to 350 nm. Shorter wavelengths may be damaging to the eyes and the skin.

Figure 2:
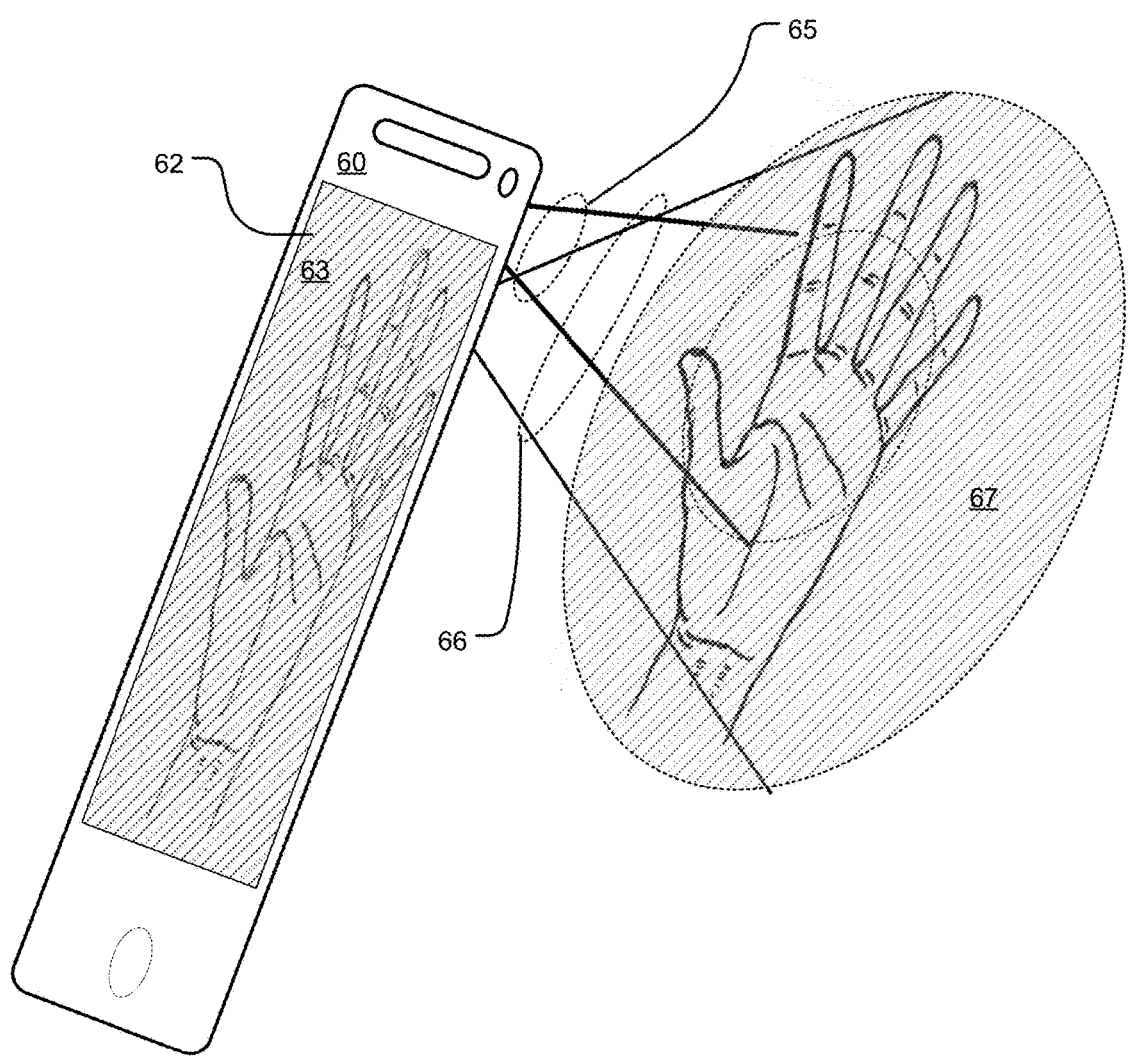
FIG. 2 illustrates a computing device with a camera and illumination device pointing away from the display surface as described herein.

FIG. 2 illustrates a computing device in an alternative configuration, which is in this example is mobile phone 60. In other examples, the computing device can be a laptop, desktop, smart TV, virtual or augmented reality (VR/AR) headsets, etc. The mobile phone includes a rear facing camera having a lens (not shown) with a field of view 65, and a display screen 62. The field of view 65 of the camera is a region below or behind the display screen 62. The mobile phone 60 includes an illumination source on the rear side with the lens of the camera configured to illuminate a field 66 below or behind the display screen 62. The illumination source can be an LED or other source according to embodiments described herein which has an emission spectrum predominately in wavelengths in a range less than 485 nm. The illumination source can be a narrow band source in the target wavelength range, or a broader band source with a filter limiting emission to the target range.

A viewfinder image 63 produced by the camera is displayed on the display screen 62 in this example. In some embodiments, the viewfinder image may be limited to a portion of the full display as discussed above. Because the illumination source has an emission spectrum having predominantly wavelengths of 485 nm or below, the color of the display screen 62 is likewise dominated by that low wavelength. For this reason, the display screen is less likely to attract attention during an authentication process.

The mobile phone 60 is a computing device that includes logic to execute the sequence of operations to perform palm print authentication as discussed above. In this example, the sequence need not include displaying an illumination pattern on the display 62. In some embodiments, a dark or lowlight pattern may be overlaid on the display screen, so that the screen is less likely to attract attention in low light conditions.

In executing the sequence of operations, an image or set of images is captured from the field of view 65 in the illuminated field 67 of a palm in which the wavelength of the illumination source is the predominant light source.

Figure 3A:
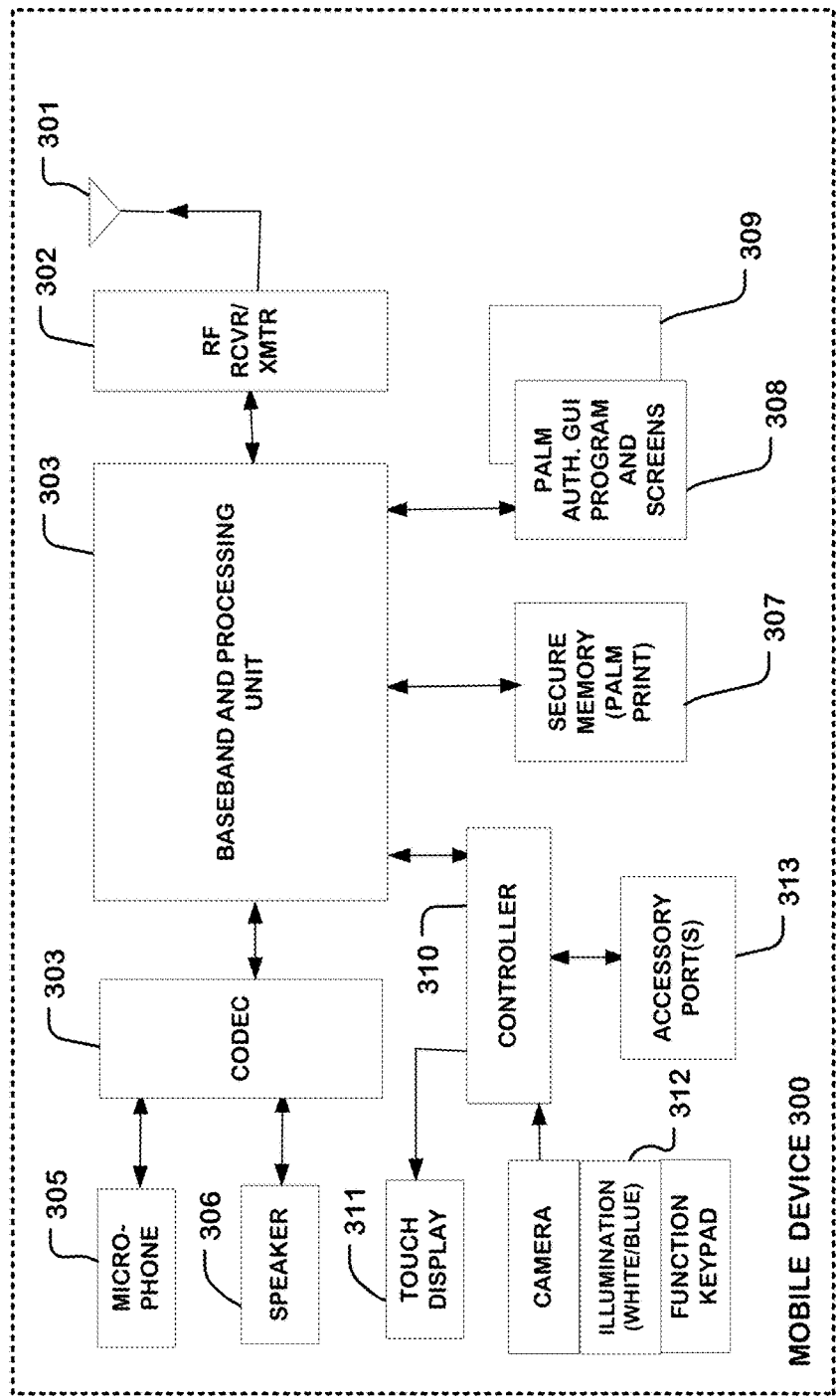
FIG. 3A is a simplified block diagram of a processing platform suitable for a mobile computing device, including resources for palm authentication as described herein.

FIG. 3A is a simplified diagram of a mobile phone computing platform 300, representative of computing devices which can be used as an apparatus for palm authentication described herein. Other computing devices configured for palm authentication, as described herein, can have a similar platform, including devices which can be modular in form factor for deployment in a variety of settings, and that are configured for communication with local servers, and devices that are configured for wireless communication via the internet, rather than the mobile phone network.

In this example, the computing platform 300 includes an antenna 301 and a radio including a radio frequency RF receiver/transmitter 302, by which the computing platform 300 is coupled to a wireless communication medium, according to one or more of a variety of protocols. In examples described herein, the RF receiver/transmitter 302 can include one or more radios to support multiprotocol/multiband communications for communication with the wireless service provider of the mobile phone network, as well as the establishment of wireless local radio links using a protocol like Bluetooth® or WIFI protocols. The receiver/transmitter 302 is coupled to baseband circuitry and a digital processor in processing section 303, in which the audio signals are processed and call signals are managed. A codec 304, including analog-to-digital and digital-to-analog converters, is coupled to the processing section 303. A microphone 305 and a speaker 306 are coupled to the codec 304.

Memory 307 which can be a nonvolatile read-only memory, stores a palm print or set of palm prints for use in an authentication algorithm, as well as instructions, parameters and other data for execution by the processing section 303. In addition, a read/write memory 308 in the mobile phone stores instructions and parameters for palm print authentication processes and other data for use by the processing section 303. There may be multiple types of read/write memory on the computing platform 300, such as nonvolatile read/write memory 308 (flash memory or EEPROM for example) and volatile read/write memory 309 (DRAM or SRAM for example). Other embodiments include removable memory modules in which instructions, parameters and other data for use by the processing section 303 are stored.

An input/output controller 310 is coupled to a touch sensitive display 311 and to user input devices 312, such as a camera, a function keypad, and an illumination source. The camera can be used to capture images for the palm print authentication, and the illumination source can provide illumination in a field of view of the camera in the blue/violet/UV range as discussed above. An accessory port or ports 313 coupled to the controller 310 are used for other types of input/output devices, such as binaural and monaural headphones, connections to processing devices such as PDAs, or personal computers, alternative communication channels such as an infrared port or universal serial bus USB port, a portable storage device port, and other things. The controller 310 is coupled to the processing section 303. User input concerning call set up and call management, and concerning use of the palm print authentication, user preference and ambient light factors is received via the input devices 312 and optionally via accessories. User interaction is enhanced, and the user is prompted to interact, using the touch display 311 and optionally other accessories. Input may also be received via the microphone 305 supported by voice recognition programs, and user interaction and prompting may utilize the speaker 306 for various purposes.

In the illustrated embodiment, memory 308 stores a program for displaying a function selection menu user interface on the display 311, such that the user can select the functions to be carried out during the generation of palm print authentication profiles discussed herein. Also, the instructions executable by the processing section 303 and/or the controller 310, are stored in a non-transitory medium such as the memory 307, 308, 309, that includes logic for executing the sequence of operations outlined above in connection with FIGS. 1 and 2.

In general, the sequence of operations executed by logic in the computing platform operates as follows. When a presence of a user's hand is detected, a detection module of the logic evaluates its location, scale and orientation in each frame, and produces a palm image for preprocessing. A preprocessing module of the logic receives the palm image, aligns it with the template palm image using a geometric transform and extracts features. A palm template stored in a database or other data storage system is comprised of a palm image of a registered person (e.g., a person known to the system through capture of the person's biometric identity), and features extracted from the imaged palm.

An optimal set of parameters such as the number of features on the template, and the matching criterion value can be determined to satisfy requirements specified for a FAR (false acceptance rate) and a FRR (false rejection rate).

Figure 3B:
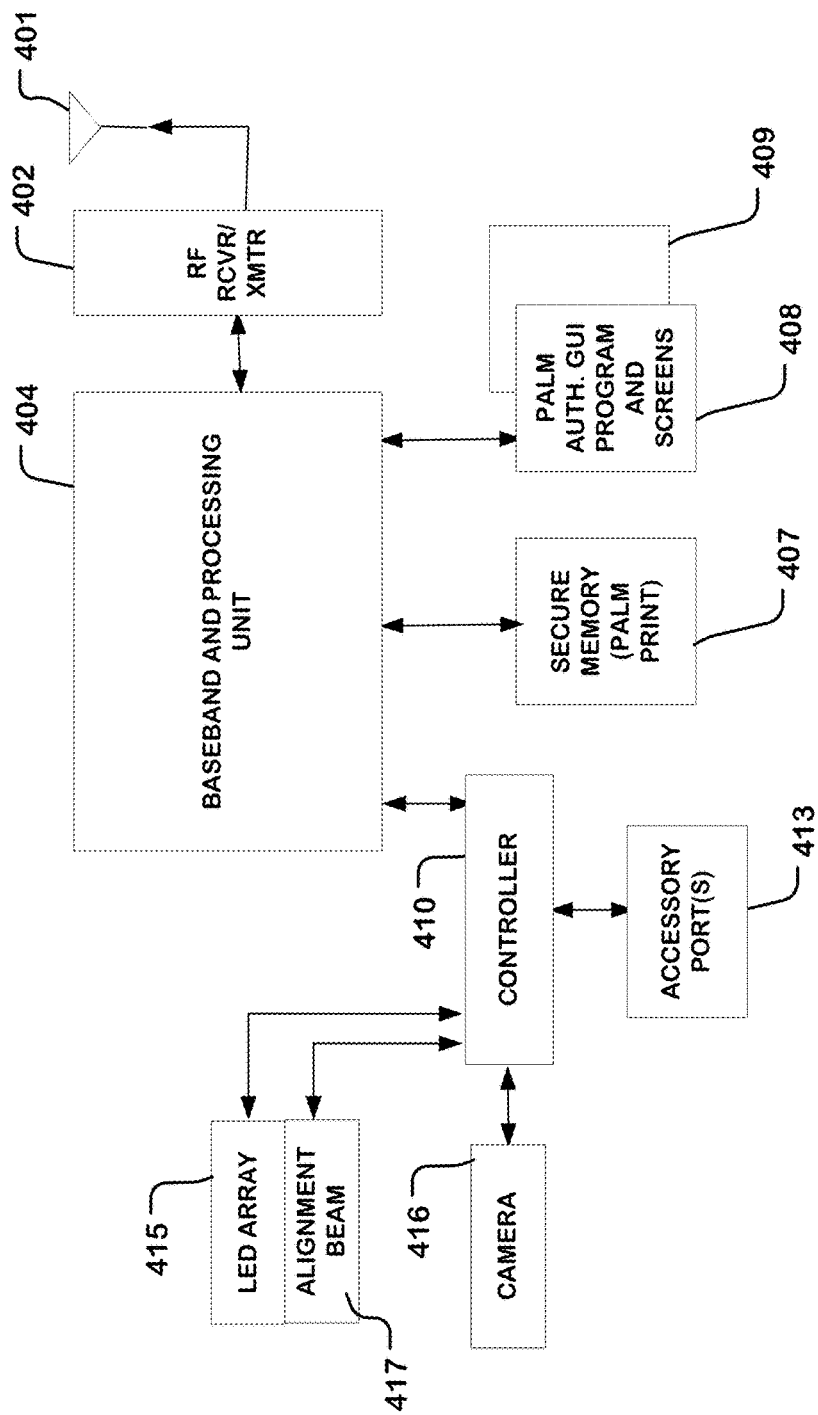
FIG. 3B is a simplified block diagram of an alternative processing platform suitable for a computing device without a display, including resources for palm authentication as described herein.

FIG. 3B is a simplified diagram of an alternative computing platform 400, representative of computing devices which can be used as an apparatus for palm authentication described herein. In this example, the computing platform does not include a display, and includes an alignment system based on an alignment beam. Other computing devices configured for palm authentication, as described herein, can have a similar platform, including devices which can be modular in form factor for deployment in a variety of settings, and that are configured for communication with local servers, and devices that are configured for wireless communication via the internet, and/or the mobile phone network. In some embodiments, the computing platform is in a separate module than the camera, or than the camera and the illumination source. For example, when deployed on an automobile having cameras mounted thereon for safety and self-driving, the computing device can be in wired or wireless electrical communication with the existing camera and an illumination source, and utilize the existing camera for authentication images.

In this example, the computing platform 400 includes an antenna 401 and a radio including a radio frequency RF receiver/transmitter 402, by which the computing platform 400 is coupled to a wireless communication medium, according to one or more of a variety of protocols. In examples described herein, the RF receiver/transmitter 402 can include one or more radios to support multiprotocol/multiband communications for communication with wireless local radio links using a protocol like Bluetooth® or WIFI protocols. The receiver/transmitter 402 is coupled to baseband circuitry and a digital processor in processing section 404, in which the video signals are processed and other logical functions are carried out using computer programs stored on the device.

Memory 407 which can be a nonvolatile read-only memory, stores a palm print or set of palm prints for use in an authentication algorithm, as well as instructions, parameters and other data for execution by the processing section 404. In addition, a read/write memory 408 in the mobile phone stores instructions and parameters for palm print authentication processes and other data for use by the processing section 404. There may be multiple types of read/write memory on the computing platform 400, such as nonvolatile read/write memory 408 (flash memory or EEPROM for example) and volatile read/write memory 409 (DRAM or SRAM for example). Other embodiments include removable memory modules in which instructions, parameters and other data for use by the processing section 404 are stored.

A controller 410 is coupled to a camera 416, and an illumination source such as LED array 415 with an emission spectrum in the range below 485 nm. In other embodiments, the illumination source may be a broadband light, and filter deployed to permit illumination in a spectrum to predominately below 485 nm. The camera can be used to capture images for the palm print authentication, and the illumination source can provide illumination in a field of view of the camera in the blue/violet/UV range as discussed above. The controller 410 is coupled to an alignment beam generator 417 such as a laser, or components used in combination with the LED array 415, to provide an alignment indication light in the field of illumination of the LED array 415.

The controller 410 is coupled to the processing section 404. User input concerning use of the palm print authentication can be provided via the wireless receiver. In some embodiments, a switch or keypad is provided by with the palm authentication procedure can be initiated. Input may also be received via a microphone supported by voice recognition programs, and user interaction and prompting may utilize a speaker for various purposes.

In the illustrated embodiment, memory 408 stores a program for functions to be carried out during the generation of palm print authentication profiles discussed herein. Also, the instructions executable by the processing section 404 and/or the controller 410, are stored in a non-transitory medium such as the memory 407, 408, 409, that includes logic for executing the sequence of operations outlined above in connection with FIGS. 1 and 2. The platform shown in FIG. 3B can be deployed in settings utilizing authentication to enable further operations, including signaling a machine to open a door, turn on a machine, and to preform operations customized to the authenticated person.

The technology disclosed can be implemented in the context of any computer-implemented system including an on-premises networked system, a cloud computing environment, hybrid approach, or the like. Moreover, this technology can be implemented using two or more separate and distinct computer-implemented systems that cooperate and communicate with one another. This technology can be implemented in numerous ways, including a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computing device, including a mobile phone or smart phone and a processing module suitable as a subassembly on a wide variety of systems. Such a computing device can include or have access via a communication network a database system storing biometric information used to authenticate individuals. Biometric information can be stored and managed using cloud based storage approaches, a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

In addition, the technology disclosed can be implemented using different programming models like MapReduce™, bulk synchronous programming, MPI primitives, etc. or different stream management systems like Apache Storm™, Apache Spark™, Apache Kafka™, Truviso™, IBM InfoSphere™, Borealis™ and Yahoo! S4™.

The technology disclosed is described herein using representative examples implementing palm print identification. A representative implementation contains two pipelines or work flows: identification and enrollment. First, the identification pipeline will be described with reference to example processes. Second, the enrollment pipeline will be described with reference to an implementation that uses a subset of the identification processes.

Identification

Figure 4:
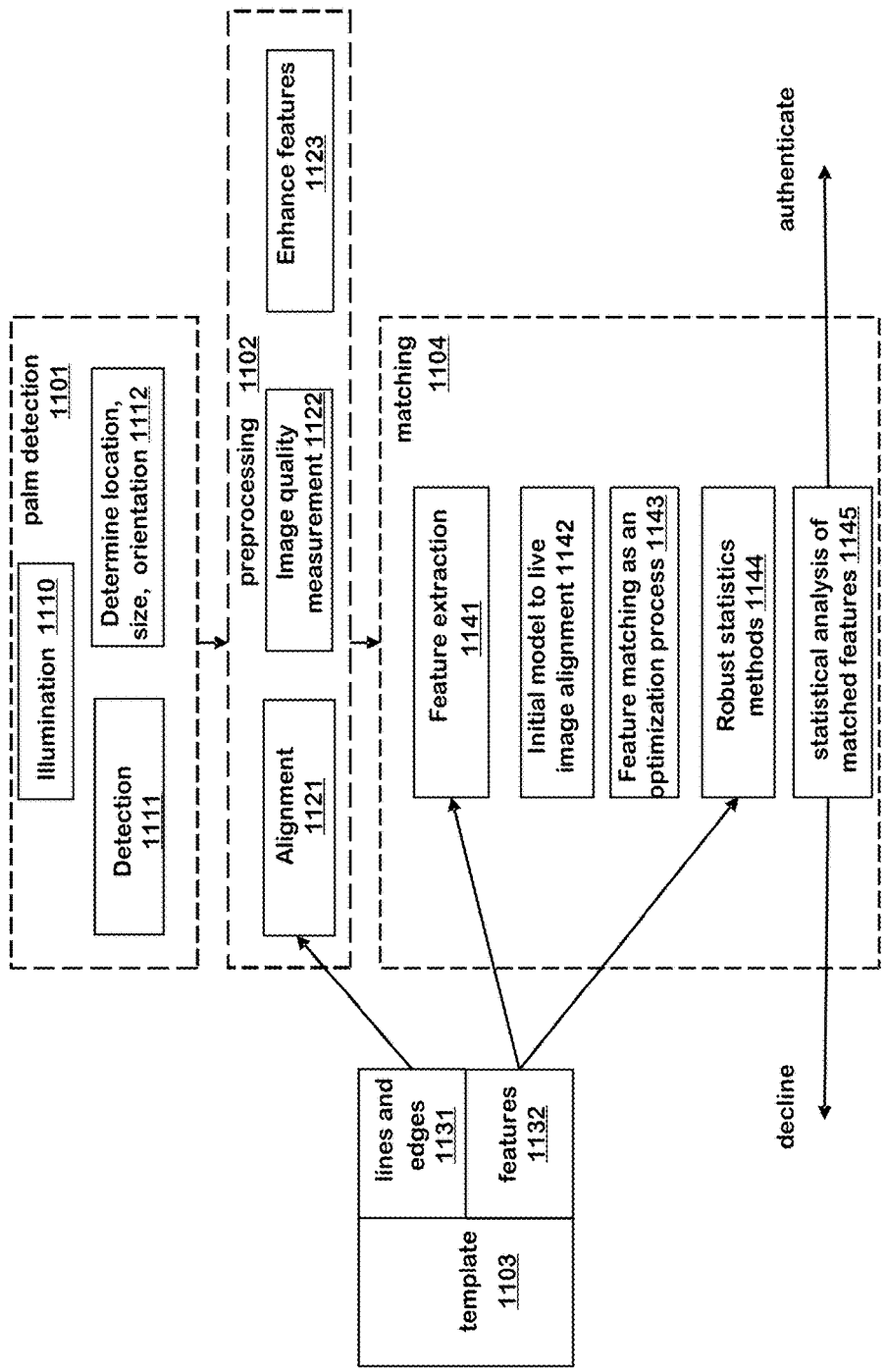
FIG. 4 illustrates an overview of an example implementation of palm detection, preprocessing and matching.

FIG. 4 illustrates an overview of an example implementation of palm detection, preprocessing and matching. A Palm detection operation 1101 includes illumination 1110 in the target wavelength range, detection processing 1111 and determination 1112 processing that determines features of the palm, including location, size and orientation. Images in which a palm is detected by palm detection operation 1101 are input to a preprocessing operation 1102. Preprocessing operation 1102 includes processes such as alignment process 1121, image quality measurement process 1122, and feature enhancement process 1123

1. Detection

The logic on the computing platform, or accessible by the computing platform can include a palm detection operation 1101. Detection of a human hand for example, in some embodiments includes determining whether a palm of an appropriate shape, size and orientation is present in the current frame of a video image. If no suitable palm is detected, no further processing is performed for the current frame and the current frame will be discarded. Otherwise, the system localizes the region of interest (ROI)—an approximately rectangular shape (or other suitable shape) that contains at least a region of the detected palm. Next processing includes providing visual feedback, which in one example implementation includes superimposing a viewfinder image from the camera video stream within a specified region in the frame of the user interface, and optionally overlaid with a feature (e.g. a rectangle, ellipse or circle) to indicate the region of interest (ROI) of the palm detected from the video stream. Next, the image frames in a set of image frames are sent along with the detected ROI information to a subsequent processing engine.

2. Image Preprocessing (Denoising, Deblurring)

The logic on the computing platform, or accessible by the computing platform can include an image preprocessing operation 1102. An example process includes an operation for capturing an input of N substantially consecutive frames with detected palm ROIs detected by the detection processing described herein. These N images can be aligned (1121) by aligning one or more features that have been located within the ROIs of respective images. A composited image is formed from the aligned images by averaging, which represents a computed output image. This output image can be sharper and contain less noise than any of the input images inside the palm ROIs (the background can actually become blurrier).

Note that one implementation of the system averages the aligned images. In other implementations, we can use other techniques where the images are combined using some weight function that can depend on image quality, time, alignment quality, etc. Noteworthy is that high quality images, when captured, enable certain implementations to use single image frames and omit averaging of images altogether.

In another implementation, an image quality measurement process 1122 is performed in which the output image is subjected to one or more quality metrics. Thresholds of quality metrics can be computed and applied to the output image. So, for example, if the output image is too dark, or not sharp or clear enough, the output image is rejected and not passed to the remainder of the pipeline.

After denoising and deblurring, an additional preprocessing that can enhance palm lines and other structural features 1123 may be applied. Possible enhancement techniques include but are not limited to: (1) Fourier or wavelet based methods that enhance high frequency component of the image such as described by Khatkar et al., "Biomedical Image Enhancement Using Wavelets," International Conference on Computer, Communication and Convergence, 17-28 Dec. 2014, Procedia Computer Science 48, pp 513-517, (2) structural filters that enhance particular structures (lines, cross-sections, etc.) in the image such as described by Frangi et al. "Multiscale vessel enhancement filtering," MICCAI '98, v. 1496, Springer Verlag, Berlin, Germany, 11 Oct. 1998, pp. 130-137.

3. Feature Extraction

The logic on the computing platform, or accessible by the computing platform can include a feature extraction operation 1141 in the matching logic suite 1104. This feature extraction operation takes input of a preprocessed image, then extracts a set of M feature points at positions with distinctive local intensity gradient patterns such as SIFT (Lowe, "Object recognition from local scale-invariant features," Proceedings of the Seventh IEEE International Conference on Computer Vision, Kerkyra, 20-27 Sep. 1999, pp. 1150-1157 vol. 2) (See, "Scale-invariant feature transform," https://en.wikipedia.org/wiki/Scale-invariant_feature_transform, downloaded 30 May 2017, 18 pages), Harris (Harris et al., "A combined corner and edge detector," In Proc. of Fourth Alvey Vision Conference 31 Aug.-2 Sep. 1988, 6 pages.) or corner features such as Harris and Fast (Rosten et al., "Faster and Better: A Machine Learning Approach to Corner Detection," in IEEE Transactions on Pattern Analysis and Machine Intelligence, vol. 32, no. 1, pp. 105-119, January 2010) features. The features are typically extracted within the center region of the detected palm ROIs to guarantee they are inside the palm and do not fall into the background.

4. Model to Live Image Alignment

The logic on the computing platform, or accessible by the computing platform can include a model to live image alignment 1142 in the matching logic suite 1104. This operation can operate on an alignment model that contains 1) an image of the user's palm captured at enrollment, 2) a rectangle region of the palm ROI, and 3) a set of 2D features extracted from the inside palm. This alignment can be achieved by aligning the two ROIs of the model and live image. Further refinement can be achieved by aligning the internal palm lines and or external palm contours.

Figure 5:
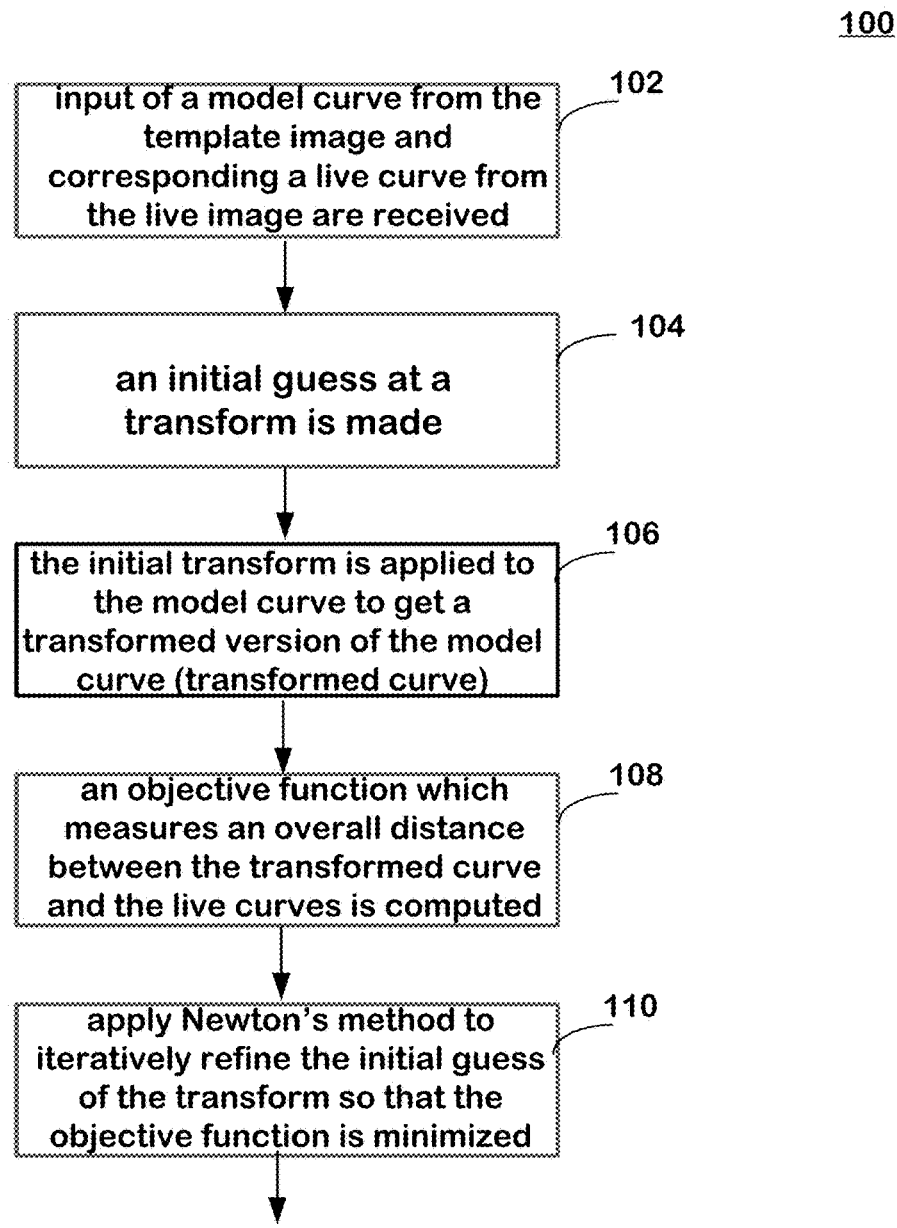
FIG. 5 illustrates a flowchart of an example implementation of an alignment process.

FIG. 5 illustrates a flowchart 100 of an example implementation of an aligning process. Flowchart 100 can be implemented by logic on the computing platform or accessible by the computing platform.

At an action 102, input of a model curve from the template image and corresponding to a live curve from the live image are received.

At an action 104, an initial guess at a transform is made.

At an action 106, the initial transform is applied to the model curve to get a transformed version of the model curve (transformed curve).

At an action 108, an objective function which measures an overall distance between the transformed curve and the live curves is computed. In an implementation, computing an objective function includes: taking sample points along the transformed curve and finding for each sample point a closest point on the live curve; and computing the sum of the square of all distances between the sample point and corresponding points on the live curve. The result of the computed sum of the squares of all distances between the sample point and corresponding points on the live curve is the overall distance between transform curve and live curve.

At an action 110, Newton's method is applied to iteratively refine the initial guess of the transform so that the objective function computed above using the refined transform is minimized. For example:

1. One parameter of the transform is perturbed by a selected amount e.g., step size (delta).
2. A new objective function (e.g., overall distance) is computed using the perturbed transform.
3. A derivative is computed by dividing the difference of the objective function evaluated by subtracting the new one from the old one by the step size.
4. The result will decide whether to continue to move along a positive side or change to a negative direction of the perturbation and the step size of the next iteration.
5. The above can continue with other parameters until the overall distance and/or a change in the overall distance meets or exceeds a threshold.

5. Match Features

The logic on the computing platform, or accessible by the computing platform can include a feature matching 1143 in the matching logic suite 1104. Using the initial alignment as discussed above, an operation is executed to iteratively refine the matching between the two sets of features to minimize the sum of square distances between corresponding feature points. The matching between the two sets of features is defined by a global transform T. Using T, a model feature point with position p is propagated into the live image at position p'. Then the operation searches around p' for the closest live image feature point q. The distance between p and q under transformation T is |p'−q|.

The nonlinear optimization may converge at a local optimum instead of a global optimum (See, "Local optimum," https://en.wikipedia.org/wiki/Local_optimum, downloaded 30 May 2017, 2 pages.). It may also be negatively impacted by the existence of outliers. To address these issues, robust statistics method such as RANSAC ("Random Sample Consensus (RANSAC)," https://en.wikipedia.org/wiki/Random_sample_consensus, downloaded 30 May 2017, 10 pages.) can be used.

6. Statistical Analysis of the Matched Features

In an implementation, the identification pipeline executed by the logic on the computing platform, or accessible by the computing platform, can provide a determination whether the live hand matches the model based upon using statistical analysis of the matched features 1145 in the matching logic suite 1104. Robust statistics methods 1144 such as techniques to avoid local minima, and to handle outliers. The model can include a user specific model having a template 1103, including lines and edges 1131 and features 1132 in FIG. 4. The iterative optimization outputs a transformation T that defines a global matching between the two sets of feature points. For a model point feature p and a live image feature q, we consider this corresponding pair to be matched when |p'−q| is less than a small threshold. The final decision on whether the palm in the live image matches the model can be made by studying the percentage of model feature points that have corresponding points in the live image matched, as well as the spatial distribution of the matched corresponding feature points, i.e., there should be corresponding feature points in different parts of the palm.

It is noteworthy that the foregoing described method is merely one way of analyzing the offset vectors. In one approach, two parameters are used: a distance threshold to identify valid patch matches and a number threshold to decide a final identity match. By proper selection of these two parameters it is possible to adjust the ratio between a false acceptance rate and a false rejection rate. The statistics underlying this approach and the selection of the parameters will be discussed herein below.

Enrollment

In order to match a live image with a user-specific model, the model is created for that user first. This is the job of the enrollment pipeline, a general overview of which is next described with reference to example implementations. The enrollment pipeline can be performed using a system including computer implemented logic, such as the computing platform 300 or an enrollment server for example, which can provide data derived from the enrollment process for use in the identification sequence.

1. Detection

The logic on the system executing enrollment, or accessible by the system can include a detection operation. Detection processing for enrollment is substantially analogous to the detection processing for the identification pipeline discussed herein above. During enrollment, video image frames of the enrollee's hand are captured and analyzed, including (a) an original image as captured, and (b) an image overlaid with a palm region of interest (ROI) depicted using a rectangle. Detection of a human hand, for example, includes determining whether a palm of an appropriate shape, size and orientation is present in the current frame of a video image. If no suitable palm is detected, no further processing is performed for the current frame and the current frame will be discarded. Otherwise, the system localizes the region of interest (ROI)—an approximately rectangular shape that contains the detected palm. In an implementation, processing includes providing visual feedback, such as for example superimposing a rectangle indicating the ROI overlain with the hand in the displayed video stream. This frame is sent along with the detected ROI information to a subsequent processing engine for denoising and deblurring. One enrollment process implementation can include prompting the user for changing positions of the hand being scanned at intervals as images are captured. In some embodiments, the hand's position can be fixed using a fixture or jig and the illumination can be controlled to take different statistical samples under different lighting environments. These differences can be blocked in statistical analysis of the captured images to obtain tighter statistical windows of confidence. Requirements for image quality and tightness of alignment can be held higher for enrollment processing in order to capture of high quality data. Quality images can provide for better matching during the identification process.

2. Image Preprocessing (Denoising, Deblurring)

The logic on the system executing enrollment, or accessible by the system can include an image preprocessing operation. Image preprocessing for enrollment is substantially analogous to the detection processing for the identification pipeline discussed herein above. Captured video image frames of the enrollee's hand are subjected to substantially identical image preprocessing techniques that take input images, and form an output image that is a composited average of the input images. This output image will be sharper and contain less noise than any of the input images inside the palm ROI (the background will actually become blurrier).

In one implementation, the denoising and deblurring processes during enrollment can be simplified using a jig or fixture to hold the hand in place. When controlled lighting is used during enrollment, averaging and denoising may not be required. Use of quality lighting can provide images that can be suitable for use without applying denoising or deblurring in certain implementations. Image differences can be blocked in statistical analysis of the captured images to obtain tighter statistical windows of confidence. Requirements for image quality and tightness of alignment can be held higher for enrollment processing in order to capture high quality data. Quality images can provide for better matching during the identification process.

3. Feature Extraction

Feature extraction in the enrollment procedure can be performed in the same way as described above for the matching procedure.

4: Extract Palm Outlines and Internal Curves

Palm outlines and internal curves can be extracted from a preprocessed image using a technique based loosely upon Canny edge detection. For further description of Canny methodologies, reference can be had to "Canny edge detector" ("Canny edge detector," https://en.wikipedia.org/wiki/Canny_edge_detector, downloaded 1 Jun. 2017, 6 pages) which is incorporated herein by reference for all purposes. Application environment specifics vary considerably, however, and different and varying techniques for extracting outlines and features in the images will be employed in various implementations.

In an example implementation, high contrast lines e.g., major palm lines can be extracted from the image. Major palm lines can include the creases formed when the human hand is bent or folded, such as the ones used by palmistry artists e.g., life-line, love-line and so forth. Another example of major palm lines are the selection of lines within the palm that represent the deepest lines. In one implementation, corners, outlines and internal curves are captured. In another implementation, the internal curves or corners exclusively are captured. In a further implementation, the outlines exclusively are captured.

5: Save Model

A user specific model (template 1103, including lines and edges 1131 and features 1132 in FIG. 4) comprises a plurality of information items, represented individually, or in combination, that include: (1) a high quality image of the user's palm, (2) the outlines and internal curves of the palm, (3) a rectangle region of the palm ROI, and (4) a set of features extracted using image data detected in the wavelength range below 485 nm.

Figure 6:
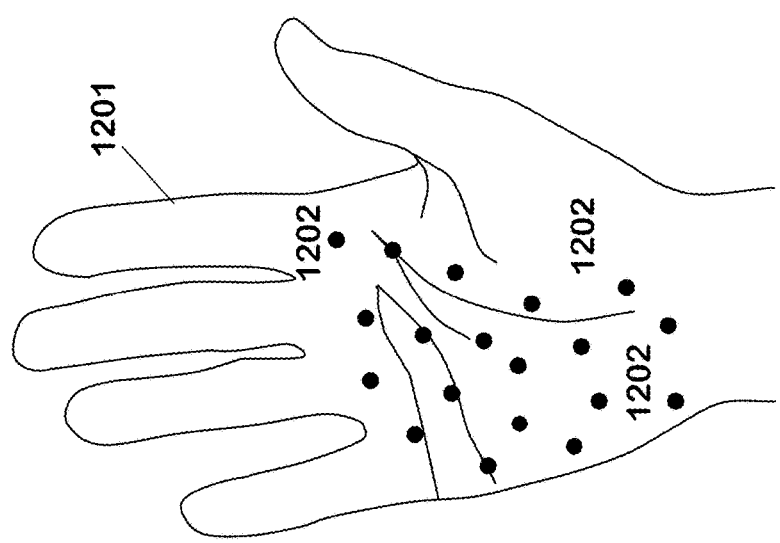
FIG. 6 illustrates features of a palm extracted using the process described herein.

When completed, the result of the enrollment process is a template that can be used to match to live images in order to identify candidates in the matching process. An example is illustrated in FIG. 6, where the outline 1201 of the palm and a plurality of locations of features 1202 are used to create a template 1200 for an authentication process.

Figure 7A:
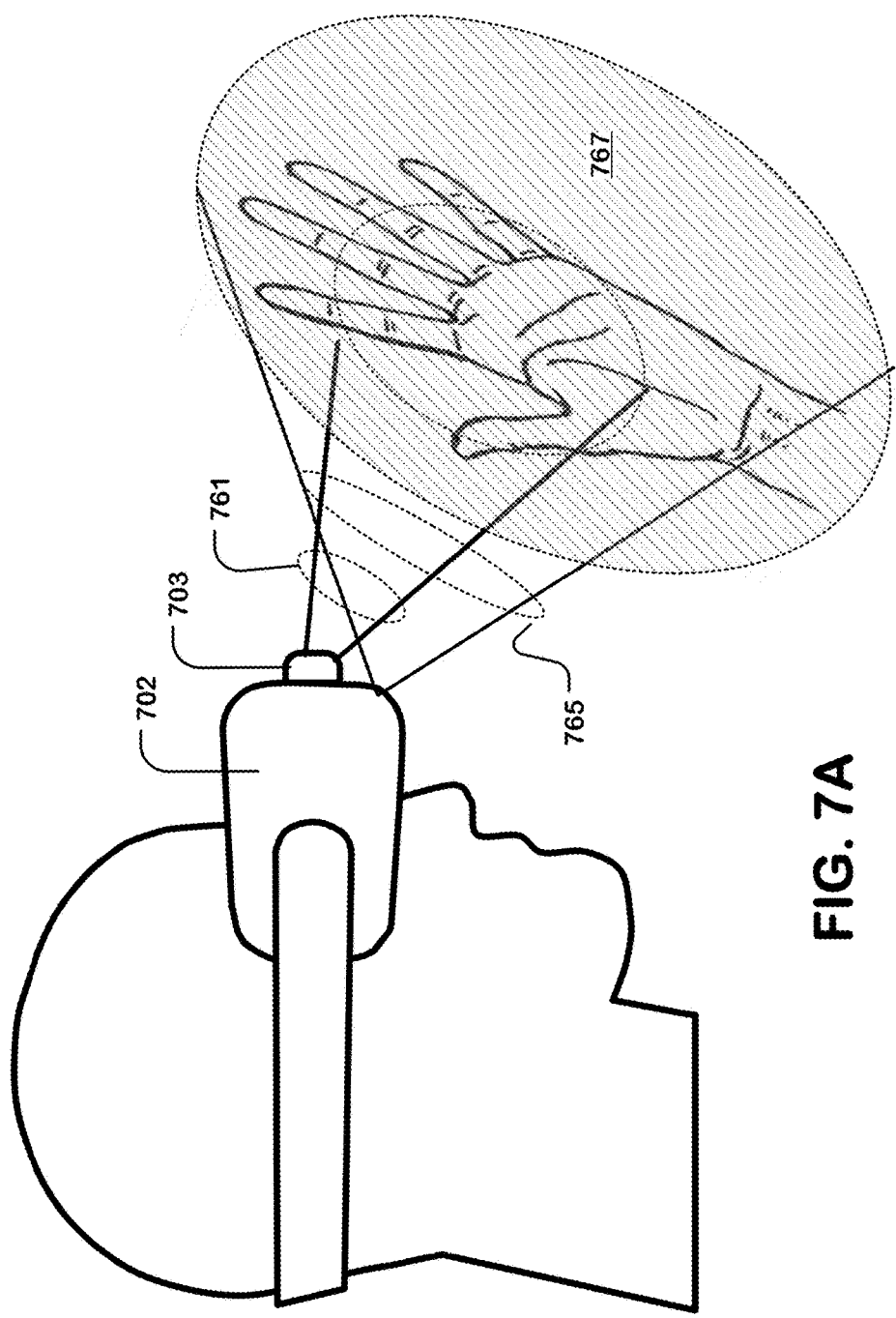
FIG. 7A illustrates an example VR headset in which one implementation can be embodied.

FIG. 7A illustrates an alternative configuration embodiment, in which a computing module as described above is disposed on a headset 702 useable for virtual reality and augmented reality functions. The headset 702 includes a forward facing camera 703 having a lens (not shown) with a field of view 761, and a display screen inside goggles. The field of view 761 of the camera is a region forward of the headset in this example. The headset 702 includes an illumination source on the front side with the lens of the camera configured to illuminate a field 765 which encompasses a region 767 in which the palm can be held by the wearer of the headset 702. The illumination source according to embodiments described herein has an emission spectrum predominately in wavelengths less than 485 nm.

A viewfinder image produced by the camera is displayed on the display screen to the person wearing the headset 702 in this example.

The headset is a computing device or is connected to a computing device that includes logic to execute the sequence of operations to perform palm print authentication as discussed above. In response to successful palm authentication, a signal is generated to enable further operations of a virtual reality or augmented reality headset.

Figure 7B:
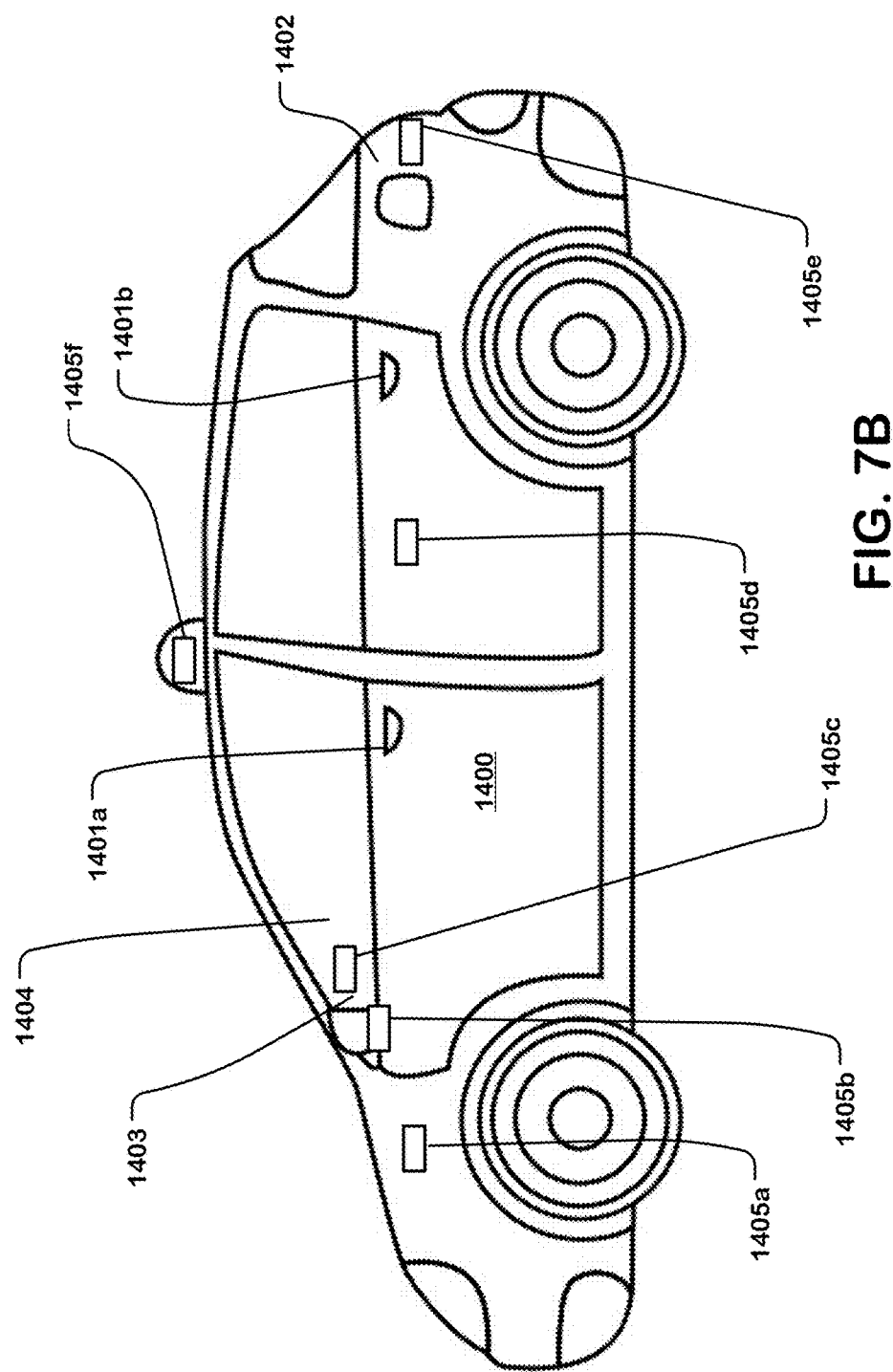
FIG. 7B illustrates an example automobile in which a variety of implementations can be embodied.

Computing platforms as described herein can also be deployed on automobiles or other machinery, and used for authentication of authorized users of the machinery to enable further functions. FIG. 7B schematically illustrates an automobile, with various configurations of computing devices configured for palm authentication as described herein. The automobile 1400 can have a number of cameras connected with computing devices that are disposed for examples in engine compartment 1405a, on the rearview mirror housing 1405b, inside the passenger compartment near the driver 1405c, on the side of the car 1405d, on the rear of the car 1405e or in a sensor compartment 1405f on the roof. The computing devices can be dedicated to individual cameras or be connected to multiple cameras. Subsystems that can be controlled by the computing devices can include subsystems to unlock or open the driver or passenger exterior doors (1401a, 1401b). Also, such subsystems can include a subsystem to unlock or open a trunk lid or rear hatch door 1402. Also, such subsystems can include a subsystem 1403 to start the engine or to enable starting of the engine. A subsystem 1404 can be deployed either inside or outside the car for personalization of things such as seat adjustment, climate control settings, entertainment system customizations, communication links to account information in the cloud, or other functions.

Signals produced by the computing platform indicating successful matching can be used to enable operation of sub-systems of an automobile, including sub-systems to open a driver-side door or a passenger-side door, to open a trunk lid, to enable starting an engine, to cause machinery to implement personalization of seating position, to cause personalization of entertainment system settings, and to cause personalization of climate system settings.

The computing devices can be configured to utilize existing cameras on the car, especially in self driving cars. Furthermore, the computing devices can include dedicated cameras. The cameras utilized by the computing devices during the authentication procedures can be placed inside the car for instance close to the control panel, or outside the car for instance in the side mirror, or on the front, back, side or top of the car.

Illumination Source

The described camera-based touchless palm-based biometric system uses some light to be reflected by the palm to be captured by the camera. Therefore, in dark environments, an additional light source may be used to provide sufficient illumination. This light source in the dark may represent a problem, because it attracts attention of other people around and may be socially unacceptable.

In an embodiment, a system is introduced where the palm is illuminated by visible violet-blue light (380-485 nm) and the palm image is captured by an RGB camera.

Figure 8:
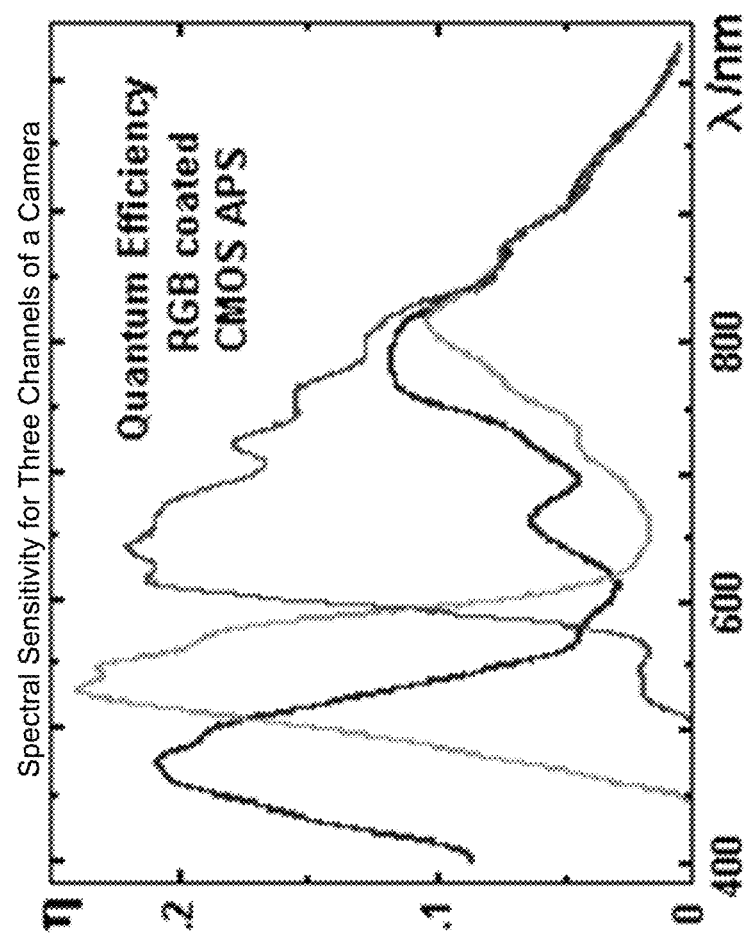
FIG. 8 illustrates spectral sensitivity curves for 3 channels of an exemplary camera.
Figure 9:
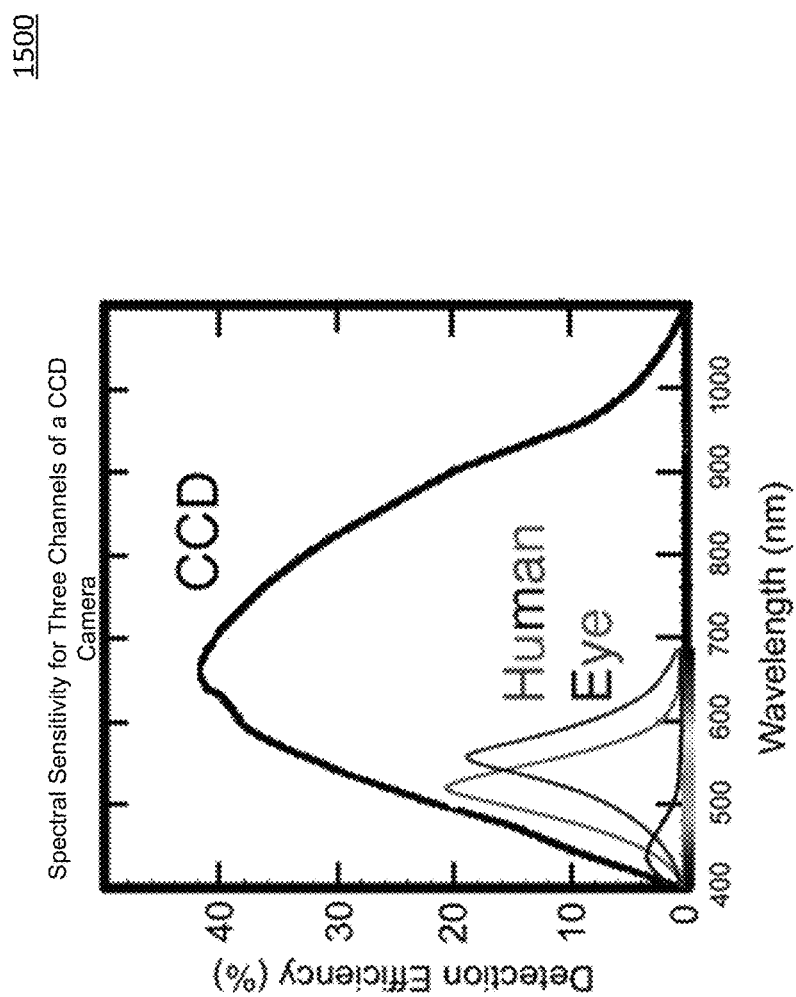
FIG. 9 illustrates spectral sensitivity curves for 3 channels of another exemplary camera.

Most of the modern RGB cameras use CMOS technology. The blue channel in such cameras remains highly efficient (about 50% of the maximum efficiency) at 400 nm, which makes CMOS cameras suitable for capturing both violet and blue light. FIG. 8 illustrates spectral sensitivity curves 1400 for three (3) channels of an exemplary camera. The older CCD technology provides smaller but still acceptable sensitivity in the violet-blue range, as shown by curves 1500 in FIG. 9.

An advantage of specific implementations is that blue-violet light temporal and spatial variations are practically unnoticeable to the human eye because the eye mostly responds to variations of perceived brightness (known as luminosity), whereas blue-violet light has very small contribution to perceived luminosity and is perceived as very dark. As a result, dark blue-violet light in a dark environment does not attract much attention.

The evidence that blue-violet light has very low contribution to luminosity comes from the formula for converting a color image to the grayscale; one is given by:

$$L=0.299*R+0.587*G+0.114*B$$

The coefficient for B is the smallest of the three coefficients R, G and B, which means that the contribution of blue light in luminosity is small compared to other hues.

Figure 10:
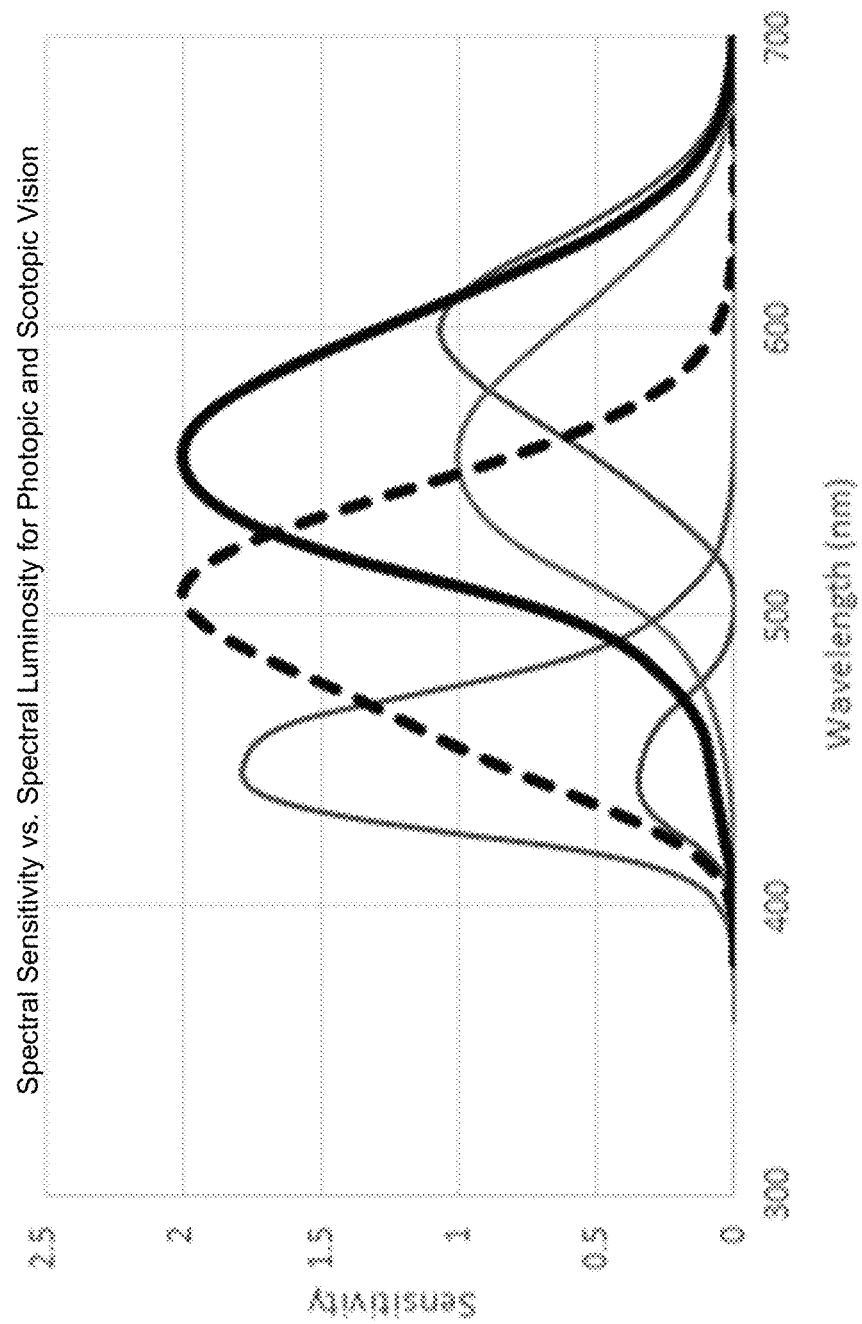
FIG. 10 illustrates spectral sensitivity curves (thin solid lined curves) that are overlaid with spectral luminosity curves for photopic (bold solid line curve) and scotopic (dashed line curve) vision.

Another way to look at the interplay between blue-violet light and luminosity is provided by FIG. 10, which illustrates spectral sensitivity curves (thin solid lined curves) overlaid with the spectral luminosity curve for photopic (bold solid line curve) and scotopic (dashed line curve) vision. The luminosity curve for dark environment is located between scotopic and photopic luminosity curves shown; the darker the environment, the closer the luminosity curve to the scotopic one. Restricting the blue-violet light to the range below 430 nm (assuming a flat high pass filter) produces at most 2.5% of luminosity compared to white light with the same power spectral density across the whole visible range. Restriction of the light to the range below 420 nm makes the illumination spot practically invisible.

Figure 11:
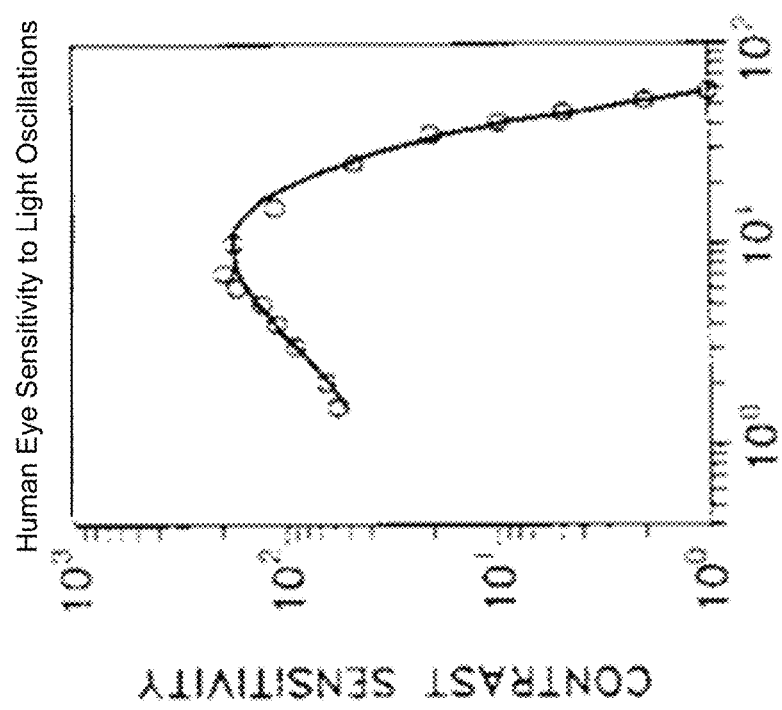
FIG. 11 illustrates human eye sensitivity to light oscillations as a function of the temporal frequency (Hz).

Finally, there is an issue of how this blue light should be presented along the time axis. FIG. 11 illustrates human eye sensitivity to light oscillations as a function of the temporal frequency (Hz). The peak sensitivity for light oscillations is close to 6 Hz, which corresponds to about 100 ms long onset. Any onset/offset transition longer than that makes the transition less noticeable. The transition duration is limited by practicality considerations; 300-500 ms is brief enough to perform authentication with no perceivable waiting.

Figure 12:
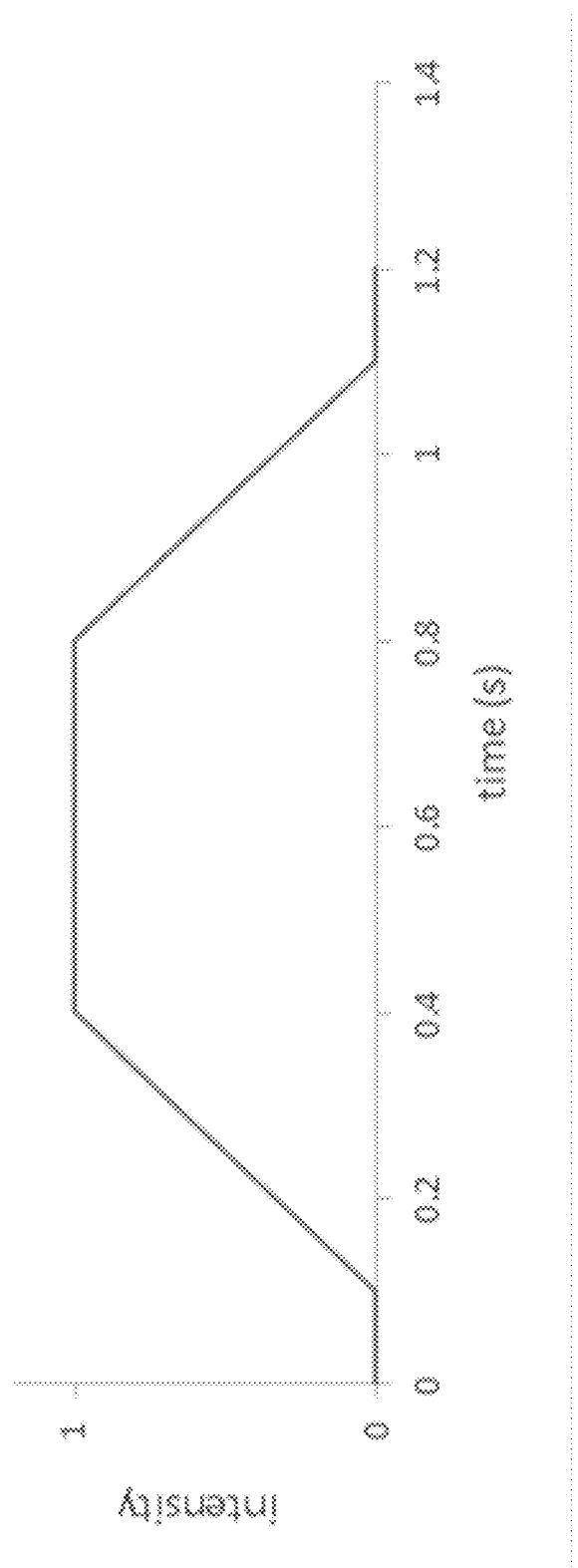
FIG. 12 illustrates a possible desirable temporal profile for use in an embodiment.

FIG. 12 illustrates a possible desirable temporal profile for use in an embodiment. The sensitivity drop at low temporal frequencies takes place only at low spatial frequencies (about 0.5 cycles/degree and lower). The light spot produced by a blue light source, therefore, should not have a sharp outside edge. The softer the light spot is, the better.

In one implementation and by way of example, a system for capturing palm lines with blue light with wavelengths below 485 nm is provided. Some implementations can provide advantages, for example: (i) produce high-contrast images; (ii) do not attract attention of other people in the dark environment. Other advantages not listed herein.

The onset/offset transition is recommended to be relatively slow (300+ ms) in an embodiment. Spatially, the spotlight should not have a sharp outer edge in some embodiments.

The blue-violet light range can be pushed toward invisible near ultraviolet (near-UV, 300-400 nm), especially for CMOS cameras, which demonstrate good sensitivity at shorter wavelengths. In this case there is no need to be concerned with temporal and spatial properties of the illuminant light. Using light in a 380-400 nm range is advantageous because this range is within CMOS cameras' sensitivity range and does not have damaging effect on the human eye, which starts at wavelengths below 320 nm.

Figure 13:
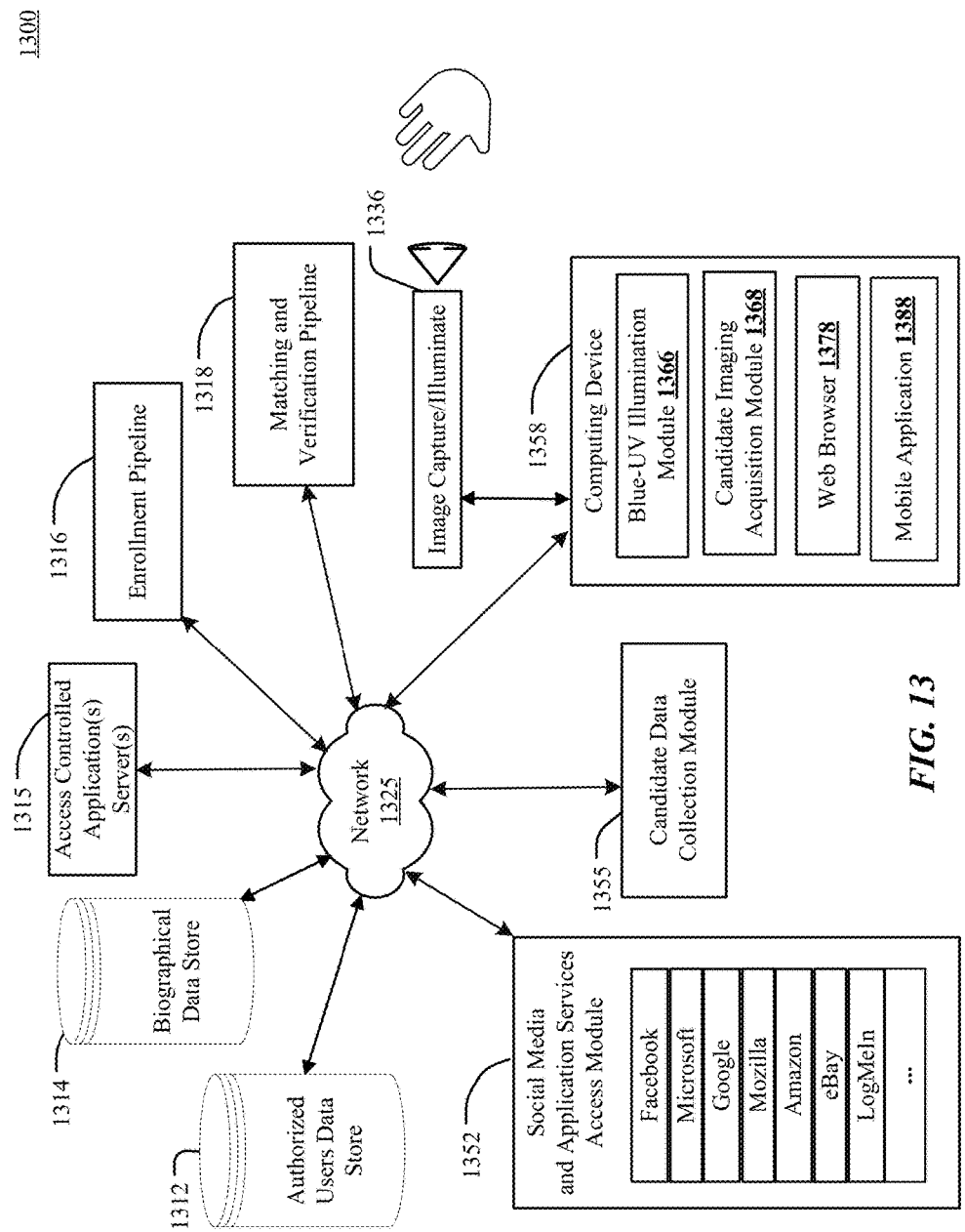
FIG. 13 illustrates an overview of an example network system in which enrollment and matching pipelines can be embodied.

FIG. 13 illustrates an overview of an example network system. FIG. 13 illustrates one implementation of a biometric network environment 1300 in which enrollment and matching pipelines can be embodied. FIG. 13 shows that environment 1300 can include authorized users data store 1312, a biographical data store 1314, an access controlled application(s) server(s) 1315, an enrollment pipeline software and/or server 1316, a matching pipeline software and/or server 1318, and a network 1325. Customization environment 1300 further includes a social media access module 1352, a candidate data collection module 1355, an image capture module 1336, and a computing device 1358. In other implementations, environment 1300 may not have the same elements as those listed above and/or may have other/different elements instead of, or in addition to, those listed above.

The authorized users data store 1312 can include candidate identification and biometric identifying information. In the authorized users data store 1312, biometric data for approved or authorized individuals can be identified as corresponding with the authorized users' biometric data provided by the matching and verification pipeline and/or server 1318. Biometric data in the authorized users data store 1312 can include different data types such as free-form text, structured text, and/or unstructured text.

Matching pipeline software and/or server 1318 can provide the biometric identification and verification functionality described herein, in a cloud computing environment, on-premises installation or hybrid thereof, which can be delivered in a subscription basis. In some implementations, matching pipeline software and/or server 1318 is on-demand software that is accessed by user sites via a thin client via a web browser or mobile application. In many implementations, the matching pipeline software and/or server 1318 supports customization, in which configuration options can be altered to fit a particular installation, to affect the look and feel and functionality of the software. For example, to support customers' common need to change an application's look and feel so that the application appears to have the customer's brand, the product can utilize a customer's logo and custom colors.

Some implementations include a biographical data store 1314 containing biographical and behavioral data for authorized users. Biographical information identifies the verification candidate and/or the candidate's company. Identifying information can include business segment and job role data, such as company name, operating division, location, job-title, normalized job responsibilities, past employment, education, and affiliations. Behavioral data can include authorized (and non-authorized attempts) to enter a premises being access-controlled by the environment 1300. Other behavioral factors such as browsing history or normalized data extracted from browsing history, and social media interactions such as recent business contacts, affiliations, mentions, subscriptions and other data that indicates or suggests to which organizations the candidate has access permissions can also be stored by biographical data store 1314.

Biographical data store 1314 includes different data types such as free-form text, structured text, and/or unstructured text. In some implementations, biographical data store 1314 can include URLs and web page content such as blog posts, as well as browsing history for videos, music and business contacts.

The access controlled application(s) server(s) 1315 can access the data of the biographical data store 1314 to match user biographic data to the candidates whose identities are verified. The access controlled application(s) server(s) 1315 can include rules or classifiers that map candidate attributes of identified candidates to applications, such as for example companies (or organizations) IT assets, that the candidate is permitted access based upon proper verification of the candidate's identity. The technology disclosed automatically authorizes a verified candidate for access to a variety of premises, systems or spaces based upon the biographical data in the biographical data store 1314. Trust-encouraging procedures and safeguards can be implemented to preserve the candidate's confidence that personal data is being used appropriately and for limited purposes, preferably with the candidate's knowledge and consent.

The access controlled application(s) server(s) 1315 can include templates for organizing information in the biographical data store 1314, as well as rules or classifiers for mapping a candidate's industry segment, job role and other attributes to selected subsets of available systems, premises or persons that the candidate is determined to have access to by the access controlled application(s) server(s) 1315. In some implementations, the biographical data store 1314 can include results obtained by running a machine learning training session using the data from the demonstration trials outcomes.

In one implementation, the candidate data collection module 1355 collects observed behavior of a particular candidate for addition to the biographical data store 1314. That is, the access controlled application(s) server(s) 1315 can adapt a candidate's permissions over time based upon collected behavioral information for the candidate. The access controlled application(s) server(s) 1315 can include rule or classifier based algorithms for mapping candidate email and browsing history and candidate social media interests to potential authorizations to people, premises and/or systems.

Social media access module 1352 may include, but is not limited to access to Facebook, Microsoft, Google, Mozilla, Amazon, eBbay, LogMeIn and so forth.

Candidate data collection module 1355 collects and manages data for the authorized users biographical data store 1314 including the interests of candidates who are subject to verification, i.e., authorized users data store 1312, typically by opting-in and giving their permission for the use of browsing information from commercial websites. This data may, for example, include a list of what products have been accessed via a candidate's browser. The candidate data collection module 1355 can monitor browser cookies, and super cookies that include X-UIDH headers. This data may additionally include topic interest information gleaned from a candidate's social media use. Other implementations could be on an opt-out basis. Sometimes, behavior watching has been implemented without notice or with notice that users are likely to miss, which is not the preferred approach.

In some implementations, the modules of environment 1300 can be of varying types, including workstations, servers, computing clusters, blade servers, server farms, or any other data processing systems or computing devices. Modules can be communicably coupled to the data store via a different network connection. For example, access controlled application(s) server(s) 1315 and enrollment pipeline software and/or server 1316 can be coupled via the network 1325 (e.g., the Internet) and candidate data collection module 1355 can be coupled to a direct network link. In some implementations, social media access module 1352 may be connected via a WiFi hotspot. In some implementations, an image capture module 1346 can be connected via the network 1325 to a computing device 1358. The image capture module 1346 can also be connected directly to computing device 1358 using Bluetooth or other popular communications medium.

In some implementations, network(s) 1325 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

The computing device 1358 includes a web browser 1378 and/or a mobile application 1388, a blue/violet/UV illumination module 1366, and a candidate imaging acquisition module 1368 that provides prompts and interface to capture images of candidates to be verified. The candidate imaging acquisition module 1368 can work in conjunction with image capture module 1346 to acquire images for verification purposes. In some implementations, computing device 1358 can be a personal computer, laptop computer, tablet computer, smartphone, personal digital assistant (PDA), digital image capture devices, and the like.

In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Particular Implementations

In one implementation, a method of matching a palm print digital representation to a palm print template is described. The method can be used to authenticate target individuals based upon capturing images of the palm of the target individual's hand or other body part substantially without contact with a surface (e.g., "touchlessly"). The technology may be embodied in stand-alone systems, wearable systems or made available over local area network (LAN), wide area network (WAN), or internetworks implementing cloud or other architectures in addition to special purpose devices (e.g., smartphone, tablets, pens, watches and the like). The method includes performing a coarse alignment of a palm print digital representation with a palm print template by translation, rotation and scaling to approximate a normalized template perimeter. Feature matching in a raster domain of a first set of at least 10 non-overlapping palm features between the digital representation and the template, can be conducted. Feature matching can include framing a location of the second feature within a predetermined distance of the selected location and at the multiple locations, selecting a best match and representing the best match with a match score and a direction and distance between the selected location of the first feature and the best match location of the second feature. The method can further include performing a fine alignment between the digital representation and template. The method further includes determining parameters for further translation, rotation and scaling of the digital representation to produce a fine-aligned digital representation. Using the distribution and distance for a plurality of the second set of features to score aggregate similarity between the fine-aligned digital representation and the template; and reporting the aggregate similarity score for further processing are also part of the method.

Some implementations also include selecting non-overlapping palm features from detected edges.

Some implementations also include selecting non-overlapping palm features from detected contours.

Some implementations also include generating a palm print template of a palm by capturing a plurality of images of at least one palm; creating a composite based on the captured images; and storing the composite as a palm print digital representation of the palm.

Some implementations also include capturing a plurality of images of at least one palm by controllably energizing one or more illumination sources according to an energy profile to advantageously illuminate the palm; thereby providing increased contrast between features of the palm to be identified and surrounding artifacts in the captured images over contrast obtained capturing images under uncontrolled lighting.

In some implementations, the one or more illumination sources are controllably energized according to a ramp profile.

In some implementations, the one or more illumination sources are controllably energized to a transition time of more than 300 ms.

In some implementations, the one or more illumination sources are controllably energized to provide illumination wavelength below 460 nm.

In some implementations, the one or more illumination sources are controllably energized to provide illumination wavelength above 320 nm.

In some implementations, the one or more illumination sources are controllably energized to provide illumination wavelength in a 380-400 nm range.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor, cause a computer to implement any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. An apparatus for identifying an individual's palm based on the individual's palm print, comprising:
   a camera;
   an illumination source arranged to illuminate a field of view of the camera, the illumination source having an emission spectrum predominantly comprised of wavelengths in a range less than 485 nm;
   a computing device including or in communication with the illumination source and the camera;
   the computing device including logic to execute a sequence of operations, the sequence of operations including:
      receiving a set of one or more images, using the camera, of a palm illuminated by the illumination source, the palm having a skin surface with a palm print;
      processing the set of images to determine a set of identifying local features of the palm skin surface, based on local intensities and local intensity gradients in light reflected from the palm skin surface, said light including emissions from the illumination source; and
      comparing the set of identifying local features with enrolled palm prints to identify the palm.

2. The apparatus of claim 1, wherein said computing device comprises a display screen, and said illuminating includes displaying an illumination pattern on the display screen using a color having a wavelength of less than 485 nm, the illumination pattern acting as the illumination source.

3. The apparatus of claim 2, wherein the sequence of operations includes displaying a viewfinder image captured by the camera while displaying the illumination pattern.

4. The apparatus of claim 2, wherein the sequence of operations includes displaying a viewfinder image captured by the camera while displaying the illumination pattern, wherein the illumination pattern is partially transparent or with opening on the display overlying the viewfinder image.

5. The apparatus of claim 1, wherein said capturing a set of images includes processing frames of image data from the camera to detect the palm within the field of view of the camera, and in response to detection, saving a set of image frames as the set of images.

6. The apparatus of claim 1, wherein said processing includes identifying local feature identified by analyzing images of a palm illuminated only by said illumination source having an emission spectrum predominantly comprising wavelengths in a range less than 485 nm.

7. The apparatus of claim 1, wherein the sequence of operations includes, upon identification of the palm, generating a signal to enable a further process.

8. The apparatus of claim 1, the illumination source emission spectrum peaking within a range of 350 nm to 485 nm.

9. The apparatus of claim 1, the emission spectrum consisting of wavelengths below 485 nm.

10. The apparatus of claim 1, wherein the sequence of operations includes, upon identification of the palm, generating a signal to enable operation of a sub-system of an automobile.

11. The apparatus of claim 1, wherein the sequence of operations includes, upon identification of the palm, generating a signal to enable operations of a virtual reality or augmented reality headset.

12. A method for identifying an individual's palm using the individual's palm print, comprising:
   illuminating a field of view of a camera with an illumination source, the illumination source having an emission spectrum predominantly comprising wavelengths in a range less than 485 nm;
   capturing a set of images, using the camera, of a palm illuminated by the illumination source, the palm having a skin surface with a palm print;
   processing the set of images to determine a set of identifying local features of the palm skin surface, based on local intensities and local intensity gradients in light reflected from the palm skin surface, said light including emissions from the illumination source; and
   comparing the set of identifying local features with enrolled palm prints to identify the palm.

13. The method of claim 12, wherein said illuminating includes displaying an illumination pattern on a display screen using a color having a wavelength of less than 485 nm.

14. The method of claim 13, including displaying a viewfinder image captured by the camera while displaying the illumination pattern.

15. The method of claim 13, including displaying a viewfinder image captured by the camera while displaying the illumination pattern, wherein the illumination pattern is a partially transparent or with opening region on the display overlying the viewfinder image.

16. The method of claim 12, wherein said capturing a set of images includes processing frames of image data from the camera to detect the palm within the field of view of the camera, and in response to detection, saving a set of image frames as the set of images.

17. The method of claim 12, wherein said processing includes identifying local features by analyzing images of a palm illuminated only by said illumination source having an emission spectrum predominantly comprising wavelengths in a range less than 485 nm.

18. The method of claim 12, including, upon identification of the palm, generating a signal to enable a further process.

19. The method of claim 12, the emission spectrum peaking at wavelengths within a range of 350 nm to 485 nm.

20. The method of claim 12, the emission spectrum consisting of wavelengths below 485 nm.

21. The method of claim 12, upon identification of the palm, generating a signal to enable operations of a sub-system of an automobile.

22. The method of claim 12, upon identification of the palm, generating a signal to enable operations of a virtual reality or augmented reality headset.

23. A non-transitory computer readable storage medium impressed with computer program instructions to match a palm print digital representation to a palm print template, which instructions, when executed on a processor, implement a method comprising:
   causing an illumination source to illuminate a field of view of a camera, the illumination source having an emission spectrum predominantly comprising wavelengths in a range less than 485 nm;
   capturing a set of images, using the camera, of a palm illuminated by the illumination source, the palm having a skin surface with a palm print;

processing the set of images to determine a set of identifying local features of the palm skin surface, based on local intensities and local intensity gradients in light reflected from the palm skin surface, said light emissions from the illumination source;

comparing the set of identifying local features with enrolled palm prints to identify the palm.

* * * * *